US011244009B2

(12) United States Patent
Horesh et al.

(10) Patent No.: US 11,244,009 B2
(45) Date of Patent: Feb. 8, 2022

(54) AUTOMATIC KEYPHRASE LABELING USING SEARCH QUERIES

(71) Applicant: Intuit Inc., Mountain View, CA (US)

(72) Inventors: Yair Horesh, Tel Aviv (IL); Yehezkel Shraga Resheff, Tel Aviv (IL); Oren Sar Shalom, Tel Aviv (IL); Alexander Zhicharevich, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 181 days.

(21) Appl. No.: 16/779,701

(22) Filed: Feb. 3, 2020

(65) Prior Publication Data

US 2021/0240781 A1      Aug. 5, 2021

(51) Int. Cl.
*G06F 17/00*     (2019.01)
*G06F 16/903*    (2019.01)
*G06F 16/93*     (2019.01)
*G06N 20/00*     (2019.01)

(52) U.S. Cl.
CPC ........ *G06F 16/90344* (2019.01); *G06F 16/93* (2019.01); *G06N 20/00* (2019.01)

(58) Field of Classification Search
CPC .. G06F 16/90344; G06F 16/93; G06F 16/313; G06N 20/00
See application file for complete search history.

(56) References Cited

U.S. PATENT DOCUMENTS

| | | | | |
|---|---|---|---|---|
| 11,030,394 B1* | 6/2021 | Kozareva | ............. | G06N 3/0454 |
| 2007/0061320 A1* | 3/2007 | Surendran | ............. | G06F 16/345 |
| 2020/0012673 A1* | 1/2020 | Rudzicz | ............... | G06K 9/6264 |
| 2020/0081977 A1* | 3/2020 | Yang | .................... | G06F 16/3346 |
| 2020/0151246 A1* | 5/2020 | Mwarabu | .............. | G06F 40/284 |

OTHER PUBLICATIONS

Michael Bendersky and W. Bruce Croft. Discovering key concepts in verbose queries. In Proceedings of the 31st annual international ACM SIGIR conference on Research and development in information retrieval, Association for Computing Machinery, pp. 491-498, Jul. 2008.*

Steven M. Beitzel et al., Automatic web query classification using labeled and unlabeled training data. In Proceedings of the 28th annual international ACM SIGIR conference on Research and development and development in information retrieval, Association for Computing Machinery, pp. 581-582, Aug. 2005.*

* cited by examiner

*Primary Examiner* — Greta L Robinson
(74) *Attorney, Agent, or Firm* — DLA Piper LLP (US)

(57) ABSTRACT

Automatic keyphrase labeling and machine learning training may include a processor extracting a plurality of keywords from at least one search query that resulted in a selection of a document appearing in a search result. For each of the plurality of keywords, the processor may determine a probability that the keyword describes the document. The processor may generate one or more keyphrases by performing processing including selecting each of the plurality of keywords having a probability greater than a predetermined threshold value for insertion into at least one of the one or more keyphrases and assembling the one or more keyphrases from the selected plurality of keywords. The processor may label the document with the keyphrase.

20 Claims, 7 Drawing Sheets

US 11,244,009 B2

AUTOMATIC KEYPHRASE LABELING USING SEARCH QUERIES

BACKGROUND OF THE DISCLOSURE

A keyphrase is a phrase that explains a longer document. For example, a keyphrase can be a word or short phrase (e.g., 1-10 words, one sentence or clause, etc.) that describes a main idea of an article, book, website, or other document. One or more keyphrases may describe the essence of a document and/or provide a summary of the document. Keyphrase extraction aims at automatically selecting a small set of phrases in a document that describe the document's main ideas. Extracting keyphrases that describe documents is a fundamental task in natural language processing (NLP) that can provide keyphrases for many applications (e.g., search engine optimization, document categorization, site navigation, etc.).

Broadly speaking, automatic keyphrase extraction methods described in the literature can be categorized into supervised and unsupervised learning approaches. Most keyphrase extraction methods use supervised machine learning and/or manual work by human experts. Even when supervised machine learning algorithms for keyphrase extraction are used, these algorithms require labeled data. Labeling is done by human annotators who label keyphrases in a corpus. The downside is the need for tedious and expensive hand-labeling. Furthermore, this costly operation must be repeated for each domain. Obtaining domain-specific labels requires extensive and inefficient manual work, and further requires storage, maintenance, and updating of a large corpus of labeled data. Moreover, manual work, or even training a supervised model on manually labeled data, introduces the possibility of error. Meanwhile, unsupervised approaches for keyphrase extraction can be unreliable in producing usable results.

DETAILED DESCRIPTION OF SEVERAL EMBODIMENTS

Embodiments described herein may use one or more automated techniques to automatically label documents for use by keyphrase extraction model training algorithms. These techniques can allow machine learning (ML) models to be trained and perform well on data that has not been labeled by human experts or that may be continuously evolving and changing. This process may leverage logged data of a deployed search engine. For example, users enter search queries into a search engine, and the search engine returns results. Users examine the results and select one or more results that they believe to be relevant to their query. As searches are performed and results are selected by a large body of users over a period of time, a large corpus of logged search engine data may be assembled. Based on the intuition that a user tells a search engine the information he needs and selects a search result that meets the need, it may be assumed that a selection by a user indicates the selected result is relevant to the query. Based on this assumption, embodiments may extract keyphrases from searches and correlated them with information from the results of those searches.

In comparison with expert-prepared labels, labels generated by embodiments may be relatively noisy and may be more or less accurate as. However, even in these cases, the massive volume and continuous refinement of these generated labels may allow ML systems to perform learning based on these labels (e.g., supervised learning). Moreover, labeling by an ML system trained on search engine data can be better than that performed by experts because it can automatically leverage the wisdom of crowds. The history of user interactions in the search engine data illustrates an actual relevance of data to keyphrases. In this sense, embodiments described herein may not only automate a process, but may also improve the accuracy and quality of process outputs relative to both human-centric and automated alternatives.

Figure 1:
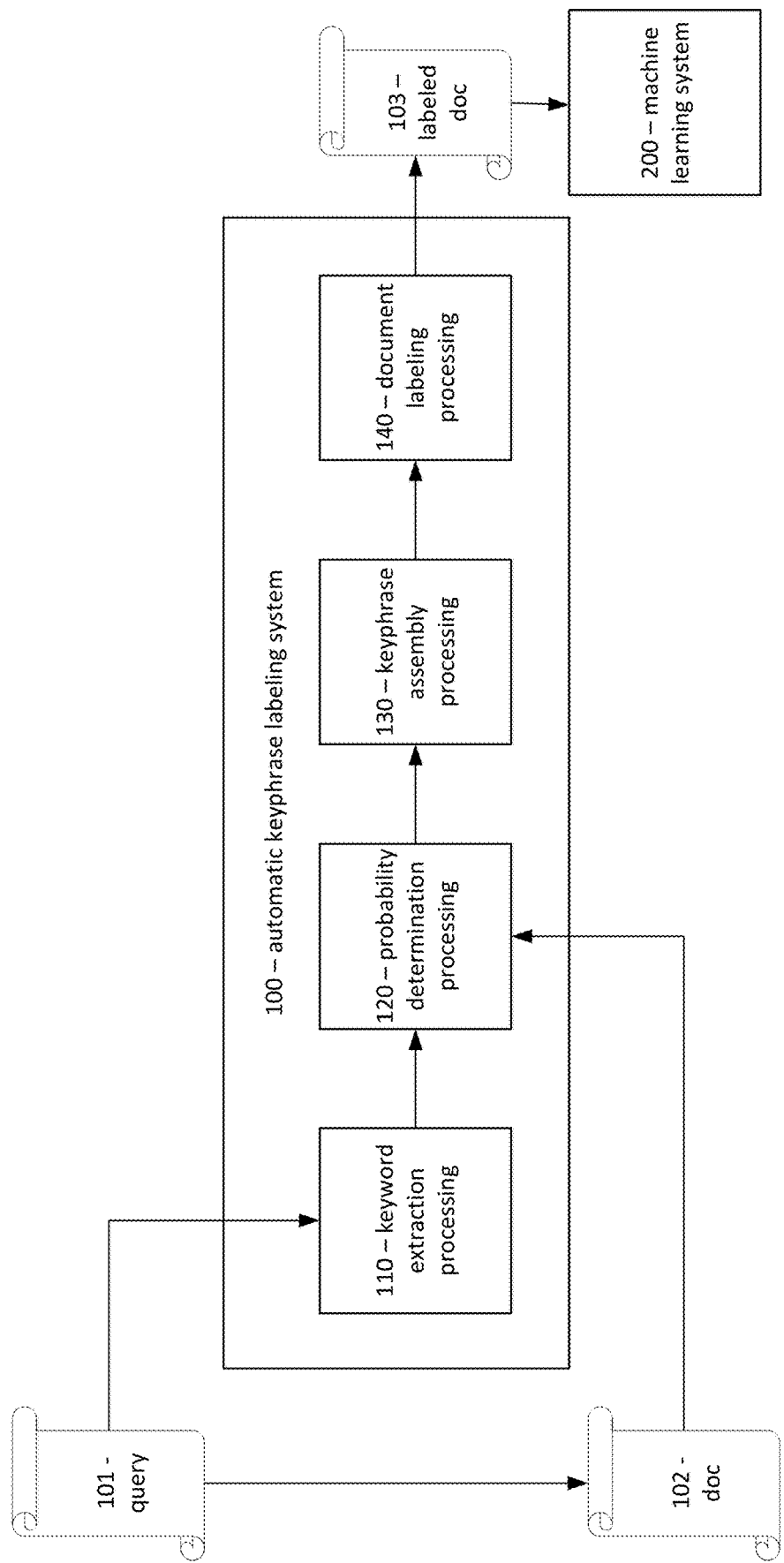
FIG. 1 shows an automatic keyphrase labeling system according to an embodiment of the present disclosure.

FIG. 1 shows an automatic keyphrase labeling system 100 according to an embodiment of the present disclosure. A search query 101 may include one or more keywords that, through processing by system 100, may form a keyphrase. A user may have entered query 101 into a search engine and received, as one of the search results, document 102 (or a link or other reference to document 102). System 100 may use query 101 and document 102 to produce labeled document 103. Labeled document 103 may include document 102 with a keyphrase label associated therewith, so that labeled document 103 may be used as training data for one or more supervised ML algorithms. System 100 may determine a keyphrase from query 101 and use the keyphrase to label document 102, thereby producing labeled document 103, as follows.

System 100 may receive query 101, where query 101 is a search query that resulted in a user selecting document 102 (e.g. by clicking on a link to document 102 in the search results, downloading document 102, etc.). System 100 may only process queries 101 that result in selections of at least one document 102, because queries 101 where documents 102 are not selected have not generated any relevant information describing the content of any documents 102. System 100 may perform keyword extraction processing 110 on query 101, which is described in detail below with respect to FIG. 3. In summary, for a query 101 containing multiple words and/or characters, system 100 may remove some words and/or characters from query 101 depending on its content (e.g., removing stop words, punctuation, etc.), such that the remaining portions of query 101 (e.g., one or more keywords) may be processed separately from the removed portions, as described below.

System 100 may process the one or more keywords from keyword extraction processing 110, along with document 102 itself, to evaluate whether the keywords describe document 102. For example, system 100 may perform probability determination processing 120, which is described in detail below with respect to FIG. 4. Probability determination processing 120 may include determining an affinity of query 101 to document 102 in terms of selection frequency, determining probabilities that each keyword describes document 102, and/or determining probabilities that portions extracted from query 101 during keyword extraction processing 110 describe document 102.

The results of probability determination processing 120 may inform subsequent processing to assemble a keyphrase relevant to document 102. For example, system 100 may use the results of probability determination processing 120 as inputs to keyphrase assembly processing 130, which is described in detail below with respect to FIG. 5. Keyphrase assembly processing 130 may include selecting keywords that describe document 102 with high probability (e.g., probability greater than a predetermined threshold), assembling them into a keyphrase, and determining a probability that the keyphrase itself describes document 102.

System 100 may perform document labeling processing 140, described in detail below with respect to FIG. 6, to label document 102 with a keyphrase developed through keyphrase assembly processing 130. For example, assuming a keyphrase was found that describes document 102 with a high degree of probability (e.g., probability greater than a predetermined threshold), document 102 may be labeled with this keyphrase, allowing labeled document 103 to be used for ML training by ML system 200. This labeling is automatic and leverages the wisdom of the crowd in a way that basic "expert" labeling cannot, thereby producing training data not only quickly and efficiently, but also with an improved level of insight and accuracy that cannot be replicated by even the most skilled human expert.

Figure 2:
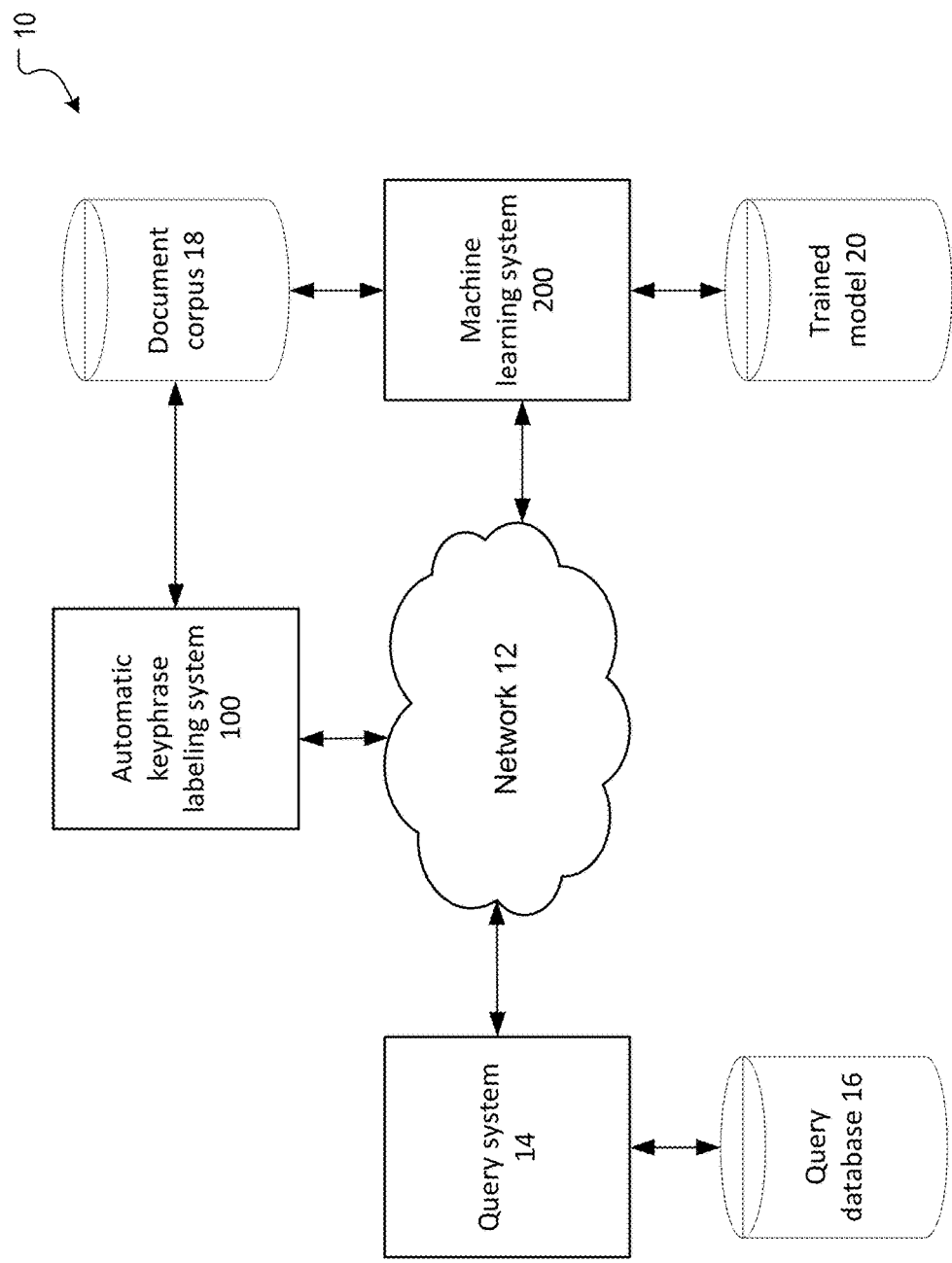
FIG. 2 shows a keyphrase labeling and machine learning computing environment according to an embodiment of the present disclosure.

FIG. 2 shows a keyphrase labeling and machine learning computing environment 10 that may leverage system 100 according to an embodiment of the present disclosure. The computing environment 10 may include one or more devices in communication with one another through a network 12. Network 12 may include any public and/or private network, such as the Internet. The devices may include automatic keyphrase labeling system 100, a query system 14, and/or a machine learning system 200. One or more of these systems may include and/or be in communication with data storage such as query database 16, document corpus 18, and/or trained models 20. These systems (including storage elements) are illustrated as separate components connected by network 12 in the example of FIG. 6, but in some embodiments, each system (or some of the systems) may collectively be elements of a single device and/or may be coupled to one another by direct connections rather than by network 12. Likewise, in some embodiments, each system (or some of the systems) may be distributed among multiple devices. An example computing device that may provide some or all elements of FIG. 2 is described below with respect to FIG. 7.

In the example of FIG. 2, text that is analyzed by automatic keyphrase labeling system 100 may be supplied by query system 14 and query database 16. For example, query system 14 may be a search engine, and queries (e.g., query 101) and results of queries (e.g., including documents 102) performed by query system 14 may be stored in query database 16. In a specific example for ease of explanation, query system 14 may be a device that provides search capabilities for an online application such as a tax preparation application or accounting application.

Query system 14 may provide data (e.g., query 101 and document 102) from query database 16 to automatic keyphrase labeling system 100 (e.g., through network 12), or in other embodiments automatic keyphrase labeling system 100 may access query database 16 directly. Automatic keyphrase labeling system 100 may process the text as described below (e.g., with respect to FIGS. 3-6). The output of such processing may include a plurality of labeled documents 102.

Labeled documents 102 may be used for any purpose. The environment 10 of FIG. 6 provides one example, which is a machine learning system 200. In the environment 10 of FIG. 6, automatic keyphrase labeling system 100 is configured to store labeled documents 103 in document corpus 18. Machine learning system 200 may train a supervised learning algorithm on document corpus 18, yielding a trained model 20. Machine learning system 200 may use any supervised learning algorithm known to those of ordinary skill in the art or developed in the future. For example, as discussed below, this allows automatic keyphrase labeling system 100 to function as an automatic training data creation system producing data without expert input that has advantageous training features relative to work produced by experts. Thus, a machine learning system 200 using the document corpus 18 for training may build more effective trained models 20 than other ML systems that use expert-produced corpus data alone. The trained model 20 may subsequently be used by machine learning system 200 to automatically identify keyphrases for unlabeled documents.

Figure 3:
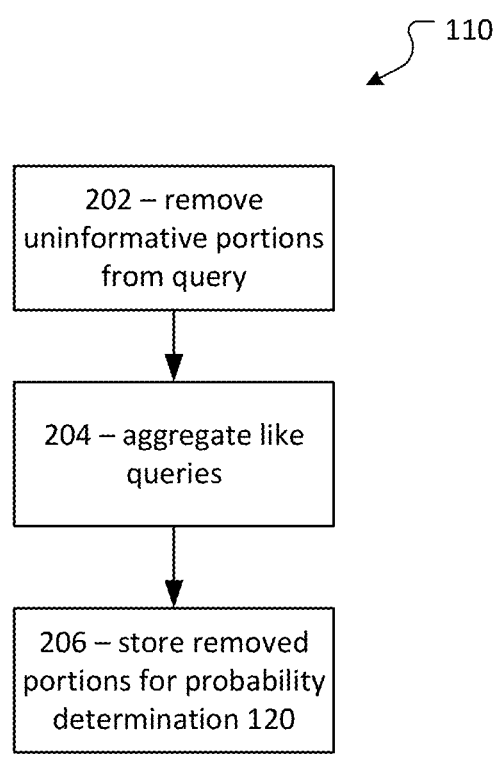
FIG. 3 shows keyword extraction processing according to an embodiment of the present disclosure.

FIG. 3 shows keyword extraction processing 110 according to an embodiment of the present disclosure. A query 101 may include multiple words and/or punctuation elements. In cases where there are multiple words and/or punctuation elements (e.g., as opposed to a single-word query 101), keyword extraction processing 110 may separate query 101 into portions that are likely to be specifically descriptive of document 102 on their own (e.g., keywords) and other portions that convey less meaning on their own (e.g., very common or "stop" words or phrases, punctuation).

At 202, system 100 may remove at least one uninformative portion from query 101, so that the remaining portion(s) of query 101 are all keywords. Generally, search queries 101 may concisely describe a user's information needs. Queries 101 are relatively short, and a large portion of their tokens (e.g., words and punctuation) is informative. Therefore, it may be computationally and logically more efficient for system 100 to extract keywords from queries 101 than from entire documents 102. For relatively simple queries 101, such as those that contain a single sentence, the extraction process may simply omit any (relatively few) uninformative tokens using a small handful of intuitive rules. For example, system 100 may apply rules such as omitting the following: tokens with dependency edges that are either auxiliary (e.g., has or should) or negation, punctuation marks, and/or stop words (that are not phrasal verb particle like blow *up*). For more verbose queries 101, system 100 may apply one or more known techniques for keyword extractions (e.g., techniques discussed in "Discovering Key Concepts in Verbose Queries," Michael Bendersky and W. Bruce Croft, Proceedings of the 31st Annual International ACM SIGIR Conference on Research and Development in Information Retrieval, A C M, 2008, the entirety of which is incorporated by reference herein).

At 204, system 100 may aggregate query 101 with like queries 101 if applicable. Since queries 101 are used as side information to the end goal of document keyphrase extraction, all queries 101 with the exact set of keywords or keyphrases may be treated as a single equivalence class. That is, queries 101 that yield the same keywords or keyphrases may be merged to be a single meta-query. Herein, after processing at 204, the term "query 101" may refer to a standalone query 101 received by system 100 or a combined meta-query, as both types may be processed similarly. For example, system 100 may have performed keyword extraction processing 110 on other queries 101 in the past. In some cases, query 101 being analyzed may be the same as a previously-analyzed query 101 after uninformative portions are removed. For example, a previous search query 101 may have been "a black dog" and the current search query 101 may be "the black dog," and both queries 101 may have resulted in selection of a document 102. Both queries 101 may be collapsed to "black" and "dog" as the keywords (which may be ordered keywords forming a keyphrase, as discussed below). Accordingly, both queries 101 may be aggregated into a single query 101 for further processing according to the processes of FIGS. 3-6 and/or other processing described herein. System 100 may store a count of queries 101 that have been aggregated and, whether aggregated or not, an indication of which document(s) 102 were selected in response to the queries 101 (e.g., a meta query may include 30 separate queries 101 with the same keywords, and the separate queries 101 may respectively have resulted in the selection of same or different documents 102), which may be used for some other processing in some cases as described below.

At 206, system 100 may store removed portions removed from query 101 for later use (e.g., within probability determination processing 120).

Figure 4:
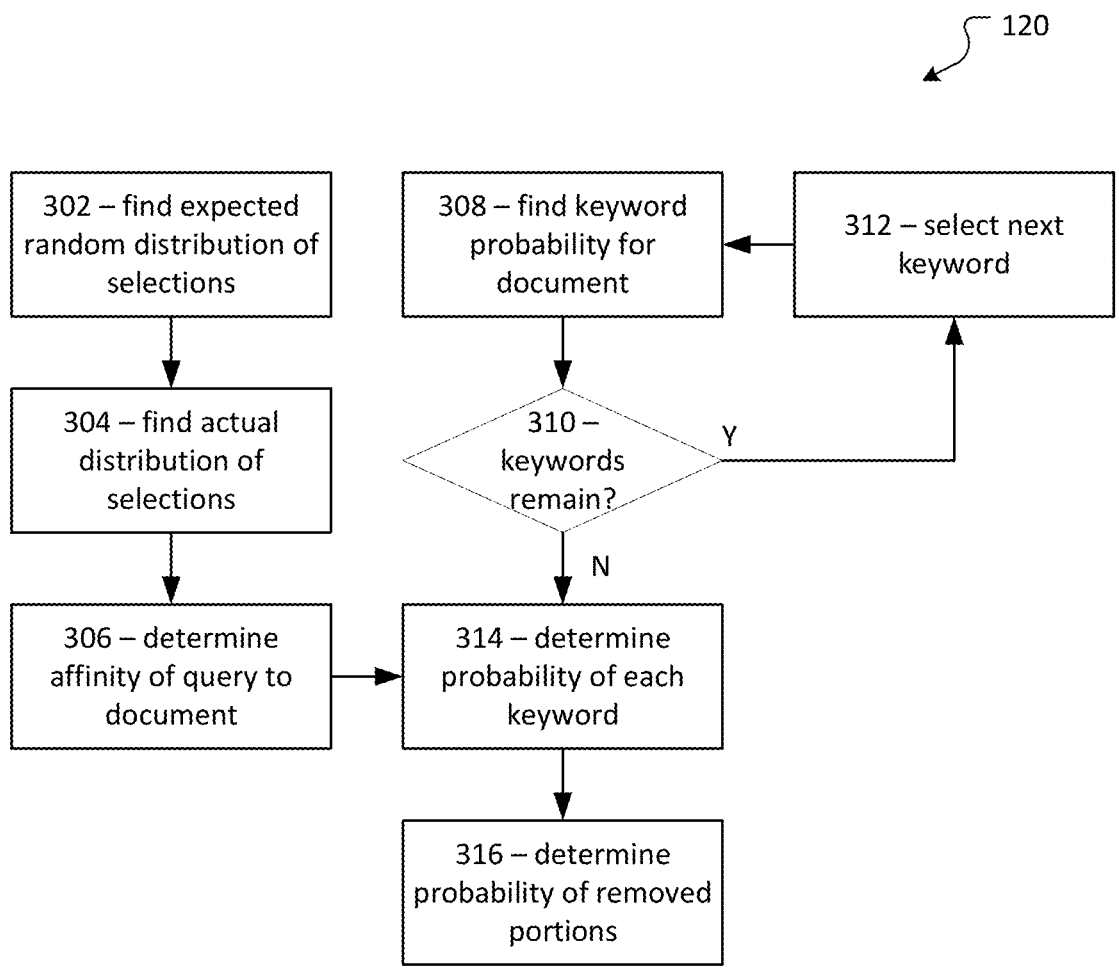
FIG. 4 shows probability determination processing according to an embodiment of the present disclosure.

System 100 may process the keywords determined as described above (and, in some cases, extracted portions stored at 206) using probability determination processing 120. FIG. 4 shows probability determination processing 120 according to an embodiment of the present disclosure. System 100 may perform probability determination processing 120 to determine probabilities that individually extracted keywords, and/or keyphrases comprising a plurality of the extracted keywords, describe document 102. As noted above, system 100 may consider only queries 101 that result in the selection of at least one document 102, but the selection might be a mistake, or the user might have decided after reviewing a selected document 102 that the document is not relevant to the query. These cases represent false positives, and the query 101 is not descriptive of the selected document 102 in these cases. Accordingly, system 100 may perform probability determination processing 120 to guard against false positives.

Probability determination processing 120 may have multiple components, including a component whereby system 100 determines an affinity of the query 101 to the document 102. The affinity may form a component of each probability of each respective keyword in the query 101. Given logged information of a search engine, it may be possible to infer the affinity between a query-document pair (q, d). For example, this may be done by considering the amount of clicks on d as a result of q and an amount of times where d was shown as part of the result set of q but was not clicked, as performed at 302-306 of probability determination processing 120. Alternatively, or additionally, system 100 may consider the average dwell time of users on document 102 after clicking through from a search result driven by query 101 as an indicator of affinity.

At 302, system 100 may determine an expected random distribution of selections of the document 102 in the search result generated by inputting query 101 among selections of any of a plurality of documents appearing in the search result. To determine the expected random distribution of selections, system 100 may construct a model under which all clicks are randomly proportional to popularity using statistics provided by the search engine to which query 101 was input. These statistics can include data such as a number of times a query was run and numbers of times each result provided in response to the query was selected. For example, assume there are two documents returned in response to query 101, doc1 and doc2. In this example, doc1 was clicked 1 million times, and 33% of users clicked on doc1 as their first selection. In the same example, doc2 was clicked 2 million times, and 66% of users clicked on doc2 as their second selection. Accordingly, if query 101 (a meta query) is asked 30 times, the model postulates that selection of doc1 should happen 10 times, and selection of doc2 should happen 20 times.

At 304, system 100 may determine an actual distribution of selections of the document 102 from the statistics provided by the search engine. As noted above, system 100 may maintain a record of document(s) 102 selected in response to a query 101. Continuing the example above, query 101 was asked 30 times, resulting in selection of doc1 29 times and doc2 one time.

At 306, system 100 may set the affinity of query 101 to document 102 based on a proportion of the actual distribution to the expected random distribution. For example, system 100 may determine a normal approximation to a binomial distribution to compute a probability of a valid connection between query 101 and document 102. Continuing the example above, the observed vs. expected binomial distribution for doc1 is 29 clicks vs. 10 expected clicks. The probability of this distribution is low (i.e., 29 clicks is much higher than expected), suggesting a valid connection between query 101 and doc1 (i.e., document 102). Taking an inverse of this binomial distribution probability may yield the probability that the connection is relevant (i.e., that the affinity exists). System 100 may determine whether this probability of affinity is greater than some predetermined threshold for relevance and, if so, determine that there is an affinity between query 101 and document 102.

Probability determination processing 120 may also have a component whereby the respective relevancies of individual keywords to document 102 are determined. When keyphrase assembly processing 130 is performed (for example, as described below with respect to FIG. 5), system 100 may use both the probability of affinity calculated for query 101 and document 102, and the individual probabilities of respective keywords, to determine whether a keyphrase accurately describes document 102. Accordingly, for each of the plurality of keywords, system 100 may determine a keyword component of the probability based on a comparison between the keyword and content of the document 102, for example as performed at 308-312 of probability determination processing 120.

At 308, system 100 may, starting with one of the keywords from query 101, find a probability that the keyword describes the document 102, which may be a keyword component of an overall probability. For example, system 100 may search document 102 for the keyword. If the exact keyword is found in document 102, system 100 may assign a 100% probability of relevance to that keyword. For at least some words, system 100 may maintain a set of synonyms and/or similar words. System 100 may search for these synonyms and/or similar words as well. For example, "boy" may be a keyword, and system 100 may find "child" in document 102 and, because "child" is listed as a similar word to "boy," may assign a 100% probability of relevance to that keyword. Alternatively, or in the case where there is no match, system 100 may use a word embedding approach to analyze probability. For example, system 100 may use word2vec or another vectorization algorithm on the keyword and the document 102 and perform unsupervised training on the document 102 as a corpus. System 100 may determine whether any of the vectors in document 102 have a similarity to the vector of the keyword (e.g., above some threshold such as 0.5). For example, this may locate similar vectors such as a vector for "reconciliation" in the keyword and a vector for "reconcile" in document 102.

At 310, system 100 may determine whether any keywords remain whose probabilities have not been calculated. If so, at 312, system 100 may select another keyword from query 101 and process the keyword as described above at 308.

Once individual keyword probabilities for each keyword have been determined, system 100 may form a combination probability for each keyword that uses both the affinity between the search query and the document and the keyword component of the probability. For each keyword, at 314, system 100 may determine this probability by multiplying the affinity probability and the keyword component together, for example.

At 316, system 100 may determine probabilities for the removed uninformative portions of the query 101 obtained at 202 in keyword extraction processing 110. To do so, system 100 may apply at least the following two rules. A first rule may apply in the case of two keywords determined to relate to document 102 above that have at least one uninformative portions interposed between. In this case, the probability of each interposed uninformative portion is determined as a function of the two keywords it is between. For example, for two keywords with scores s1 and s2, the score of each intermediate uninformative token may be given by min(s1, s2). A second rule may remove singular keywords. For example, if a token is marked as a keyword, but its surrounding tokens are not (i.e., are uninformative removed portions), then it may be removed as a keyword regardless of its score, along with the surrounding tokens.

Figure 5:
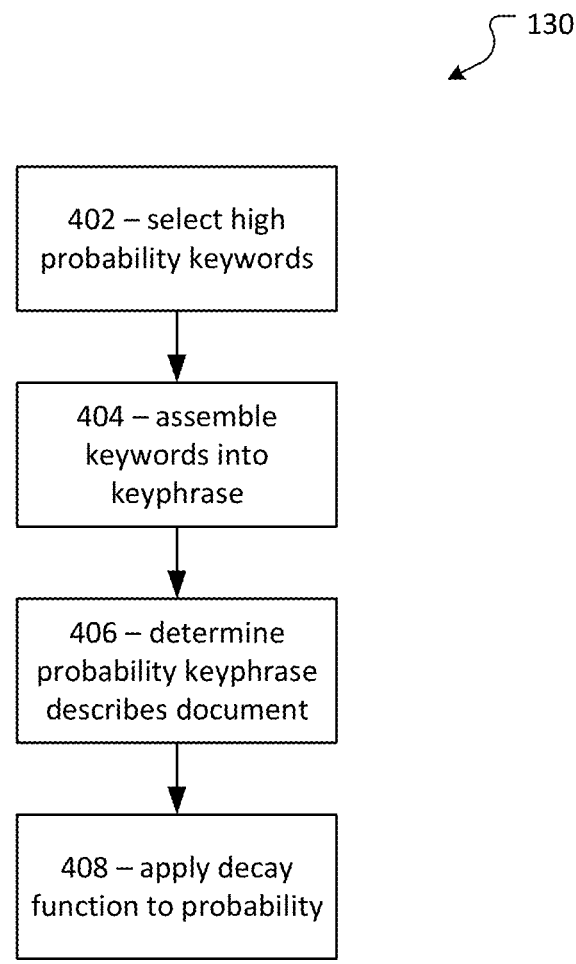
FIG. 5 shows keyphrase assembly processing according to an embodiment of the present disclosure.

FIG. 5 shows keyphrase assembly processing 130 according to an embodiment of the present disclosure. After keywords have been assigned probabilities by probability determination processing 120, system 100 may perform keyphrase assembly processing 130 to construct keyphrases that describe document 102 with high probability.

At 402, system 100 may select high probability keywords as determined by probability determination processing 120 for inclusion in the keyphrase. For example, all keywords and extracted portions with probability scores that exceed some threshold may be finally marked as keywords for the purpose of assembly into a keyphrase.

At 404, system 100 may assemble keywords as marked at 402 into a keyphrase. Consecutive keywords may be assembled into a single keyphrase in the order in which they originally appeared in a query 101. For example, query 101 may have been "What is the airspeed velocity of an unladen swallow?" The first three words and the final punctuation mark may have been eliminated as being uninformative portions (stop words and punctuation) not surrounded by keywords. Thus, the keyphrase that results is "airspeed velocity of an unladen swallow" with four descriptive words (airspeed, velocity, unladen, swallow) and two stop words that are surrounded by descriptive words (of, an), in the order in which they appeared in query 101.

At 406, system 100 may determine an overall probability that the keyphrase describes the document, for example by multiplying the probabilities for each word in the keyphrase together.

At 408, system 100 may apply a decay function to the probability determined at 406. For example, the decay function may allow the relevance of the keyphrase to adjust as a document 102 changes in popularity. This may be based on the assumption that the a priori probability of a token to be a keyword is independent from the number of clicks (popularity) of the document. However, as observed from the data, there can be a positive correlation between document popularity and proportion of keywords. This correlation can be explained by the fact that unpopular documents lack queries that could provide evidence for tokens being keywords. Therefore, system 100 may introduce the notion of a yet unobserved query which would lead to a click on a specific document and mark a specific token as a keyword. Intuitively, it may be said that if a document is already popular, then the existence probability of an unobserved query is low, and vice versa. System 100 may use a sigmoid function that decays to zero so that as popularity increases, system 100 can decrease the probability of having a hidden query on the document. This may be done because there may be a positive correlation between document popularity and proportion of keywords. This correlation can be explained by the fact that unpopular documents lack queries that could provide evidence for tokens being keywords.

Mathematically, the above-described probability determination processing 120 and keyphrase assembly processing 130 may be restated as follows.

The objective is to utilize the information in queries in order to label keyphrases in the associated documents. To achieve this, system 100 may assess the affinity between each query-document pair. Denote $Q_d$ the set of queries that led to clicks on a document d. A query $q \in Q_d$ may be associated with an erroneous or random click, and in that case may not in fact contain relevant information. Denote the probability that a document d is indeed relevant to a query q with $P_r(d|q)$.

Given that d is relevant to q, it can be asserted that if q appears in d as a sub-string, then it is a keyphrase in d. These may not be all the keyphrases, for instance since the same idea may appear in different wording. System 100 may use click data to widen the search, based on a bag-of-words approach. For each nonstop-word token t ∈ d, system 100 may compute the likelihood of it being part of a keyphrase. Denote the event of having t as a keyword in d with $kw_d(t)^1$. One task of system 100 may be to assess this probability.

The token-level granularity used by system 100 may allow system 100 to overcome the problem of exact string matching by computing the probability that a token t appears in a clicked document d is relevant to a query q. Denote the probability of this event $P_r(t|q)$. Each query $q \in Q_d$ is an observation that contributes information regarding the event $kw_d(t)$. Putting this together, system 100 can use the following model:

$$P_r(kw_d(t)|q) = P_r(t|q) \cdot P_r(d|q) \quad (1)$$

with slight abuse of the probabilistic notating this reflects the understanding that a token is a keyword in a document based on a query if both the document is relevant to the query, and the token is relevant to the query.

To compute $P_r(t|q)$, system 100 can estimate the probability that a token is relevant to a query using a unigram language model. Essentially, system 100 can judge each token in the document according to the most similar token that appears in the search query. For a token in the document that has a match (a similar enough word in the query string), the probability of relevance may be computed based on this similarity:

First, if token t appears in q, it can be said to be relevant to the query, and system 100 can set $P_r(t|q)=1$. Otherwise, system 100 may compute the relevance of t using distributed representation using a noise-contrastive estimation (NCE)

word embedding model that was trained on a corpus. NCE word embedding approximates the conditional probability of a term t, given a context term $t_i$ by $P(t|t_i)=e^{\vec{t}\cdot\vec{t_i}}\cdot k^2$, where k is the number of negative samples and $\vec{t}$ and $\vec{t_i}$ are the vector representations of the target and context words, respectively. System 100 may use the combMAX aggregation method, and set $P_r(t|q)=\max_{t_i\in q}P(t|t_i)$. To reduce noise, system 100 may further apply a threshold of 0.5.

To compute $P_r(d|q)$, system 100 can take into account the fact that the same query may be searched multiple times (possibly by different users), and may lead to multiple clicks on various documents. Denote by c(q,d) the count of clicks on document d as a result of querying q, and likewise $c(q)=\Sigma_{d\in D}c(q,d)$ and $c(d)=\Sigma_{q\in Q}c(q,d)$, the total number of clicks resulting from a query, and on a document respectively. Furthermore, define the "universe" of query q as the set of documents clicked at least once following the query, that is: $U_q=\{d|c(q,d)>0\}$.

The aim now, given the universe of a query, may be to determine when d appears relevant to q due to information content rather than erroneous or sporadic clicks. Intuitively, the larger c(q,d), the likelier it is that q is indeed relevant to d. However, the number of clicks is affected by the overall popularity of both the query and the document. Hence, system 100 can compute the p-value of the observed c(q,d) against a null hypothesis where following a query, a set of documents is presented and one is clicked randomly with probability proportional to its overall popularity. Thus, given a query q, the probability of clicking on a document d under the null hypothesis is $p_d:=c(d)/(\Sigma_{d'\in U_q}c(d'))$. This reduces to binomial hypothesis testing, which can be approximated by a normal distribution with mean $c(q)\cdot p_d$ and variance $c(q)\cdot p_d(1-p_d)$.

Finally, a token t may be detected as a keyword in a document due to different queries, with a goal being determining the probability of t being a keyword under any query. By assuming independence, system 100 can compute the aggregated probability as:

$$P_{kw}(t)=1-\Pi_{q\in EQ_d}(1-P(k_{wd}(t)|q)) \quad (2)$$

System 100 may handle missing data based on the assumption that the a priori probability of a token to be a keyword is independent from the number of clicks (popularity) of the document. However, there may be a positive correlation between document popularity and proportion of keywords. This correlation can be explained by the fact that unpopular documents lack queries that could provide evidence for tokens being keywords.

Accordingly, system 100 may introduce the notion of a yet unobserved query which would lead to a click on a specific document and mark a specific token as a keyword. System 100 may model the probability of the existence of such a query by a decreasing sigmoid of the popularity of the document c(d), scaled to the range [0,μ] and having a central slope of β, where μ is the a priori probability of being a keyword in the dataset. That is: $f_\beta(c(d)):=2\mu\cdot(1-\sigma(\beta\cdot c(d)))$ where σ(•) is the sigmoid function. This formulation lets the probability of being a keyword slide from p for a new document, to the observed value for a well-established (popular) document. This entails that the set of relevant queries is expanded by one, and Eq. 2 is modified accordingly: $P_{kw}(t)=1-(1-f_\beta(c(d)))\cdot\Pi_{q\in Q_d}(1-P(k_{wd}(t)|q))$. In order to estimate the values of p and β, system 100 may use the most popular documents, assuming they have approximately full coverage of queries, leading to few missing keywords. Using this set, system 100 can compute p. Under the described assumption, an optimal 13 will "correct" the probabilities of the tokens, such that they will be independent to the popularity of the documents. The estimated proportion of keywords is computed as:

$$\mu_d(\beta)=(1/|d|)\Sigma_{t\in d}1-(1-f_\beta(c(d)))\cdot\Pi_{q\in Q_d}(1-P(k_{wd}(t)|q))$$

where |d| stands for the amount of tokens in document d. Using gradient descent, system 100 may find a value β that minimizes the sum of square deviation of the estimated proportion of keywords from the true value μ: $\beta^*=\arg\max_\beta \Sigma_{d\in D}(\mu_d(\beta)-\mu)^2$.

As post processing, system 100 may label consecutive stop words between keywords as keywords with probabilities equal to the minimal probability of the non-stop-word tokens comprising it. Next, system 100 may omit remaining singleton keyphrases, unless they are derived from the identical single-word query.

Figure 6:
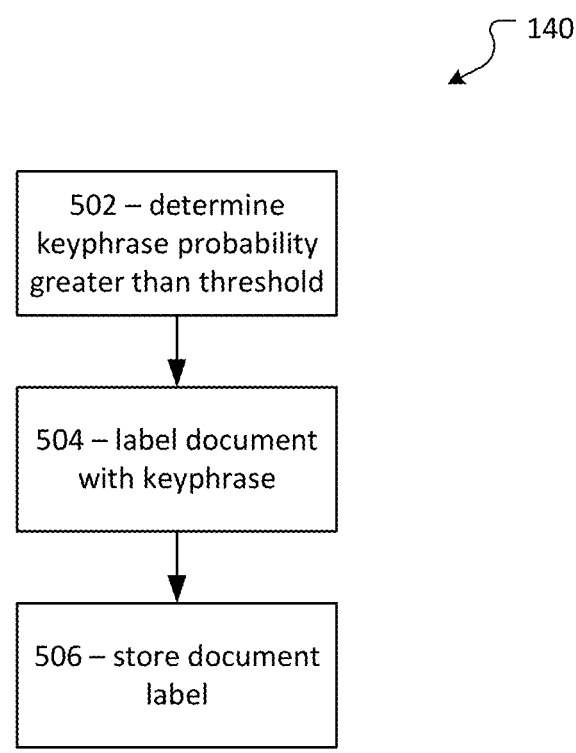
FIG. 6 shows document labeling processing according to an embodiment of the present disclosure.

FIG. 6 shows document labeling processing 140 according to an embodiment of the present disclosure. System 100 can label document 102 using the keyphrase determined as described above, which may allow document 102 (with its label) to be used as training data for a supervised ML process that produces a model for automatically identifying keyphrases for unlabeled documents, for example.

At 502, system 100 may compare the probability for the keyphrase determined as described above with a threshold probability value. If the keyphrase has a probability of describing document 102 that is higher than the threshold probability value, system 100 may determine that the keyphrase is an accurate label for document 102.

At 504, system 100 may label document 102 with the keyphrase having a probability greater than the threshold value. At 506, system 100 may store the document label along with document 102 so that the labeled document may be used (e.g., for ML training or any other purpose).

Figure 7:
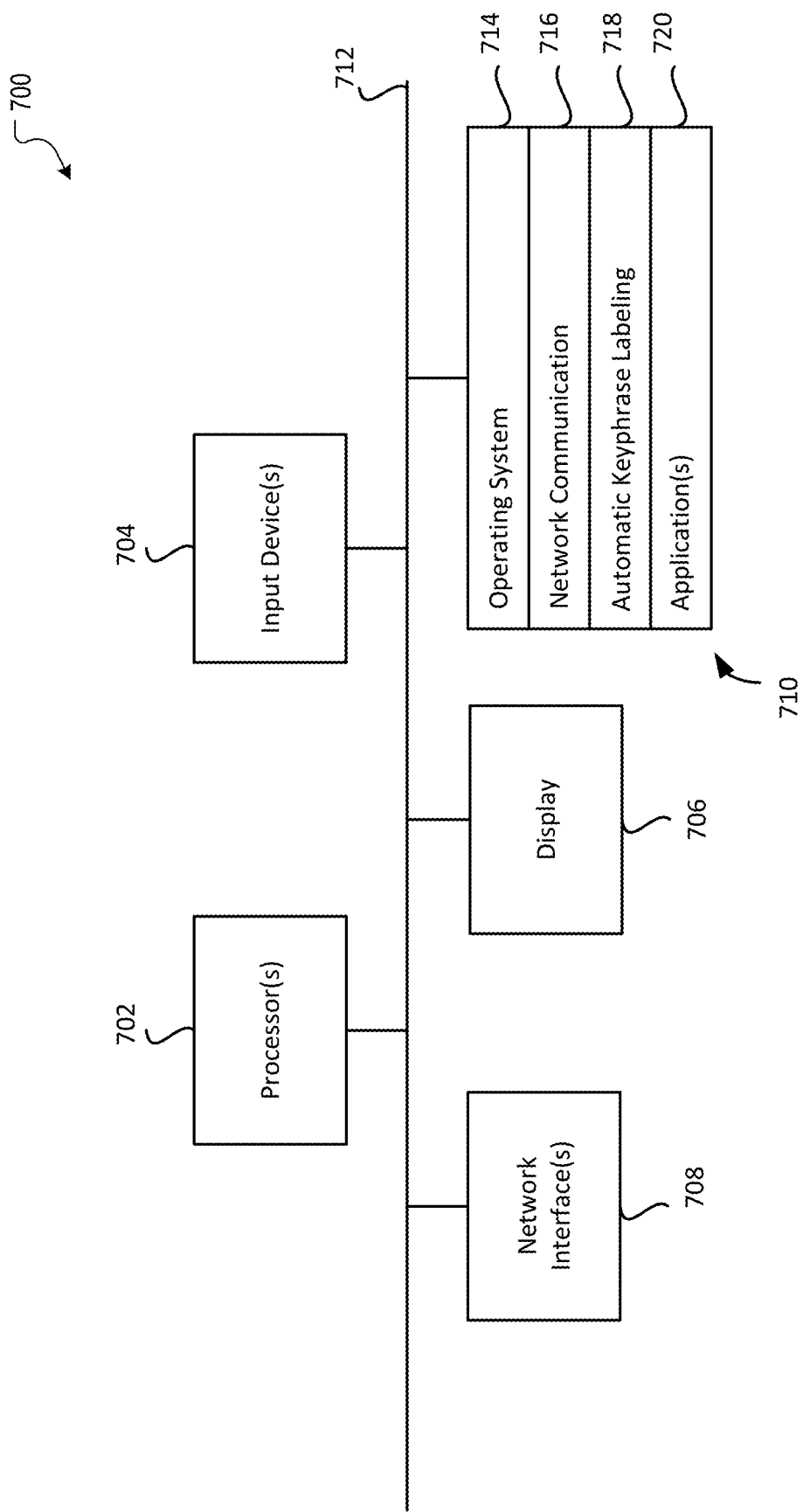
FIG. 7 shows a computing device according to an embodiment of the present disclosure.

FIG. 7 shows a computing device 700 according to an embodiment of the present disclosure. For example, computing device 700 may function as automatic keyphrase labeling system 100 and/or as query system 504, machine learning system 200, any combinations thereof, or any portions thereof. Computing device 700 may be implemented on any electronic device that runs software applications derived from compiled instructions, including without limitation personal computers, servers, smart phones, media players, electronic tablets, game consoles, email devices, etc. In some implementations, computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. In some embodiments, some or all devices shown as coupled by bus 712 may not be coupled to one another by a physical bus, but by a network connection, for example. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

Automatic keyphrase labeling instructions 718 may include instructions that enable computing device 700 to perform automatic keyphrase labeling system 100 functionality as described herein. Application(s) 720 may be an application that uses or implements the processes described herein and/or other processes, for example applications used to provide the functionality of query system 14 and/or machine learning system 200. The processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of automatic keyphrase labeling comprising:
    extracting, by a processor, a plurality of keywords from at least one search query that resulted in a selection of a document included in a search result;
    for each of the plurality of keywords, determining, by the processor, a probability that the keyword describes the document;
    generating, by the processor, one or more keyphrases, the generating comprising selecting each of the plurality of keywords having a probability greater than a predetermined threshold value for insertion into at least one of the one or more keyphrases and assembling the one or more keyphrases from the selected plurality of keywords;
    labeling, by the processor, the document with the one or more keyphrases; and
    storing, by the processor, the labeled document as training data in a document corpus.

2. The method of claim 1, wherein the extracting comprises removing at least one uninformative portion from the at least one search query, wherein the plurality of keywords comprises a portion of the at least one search query that remains after the at least one uninformative portion is removed.

3. The method of claim 2, wherein the assembling comprises:
    assigning a probability to each word in the at least one uninformative portion; and
    incorporating each word with probability assigned into the keyphrase for the document.

4. The method of claim 1, wherein the determining comprises determining an affinity between the search query and the document, the affinity forming a component of each probability of each respective keyword.

5. The method of claim 4, wherein determining the affinity comprises:
    determining an expected random distribution of selections of the document in the search result among selections of each of a plurality of documents appearing in the search result, wherein the document is one of the plurality of documents;
    determining an actual distribution of selections of the document; and
    setting the affinity based on a proportion of the actual distribution to the expected random distribution.

6. The method of claim 1, wherein the determining comprises, for each of the plurality of keywords, determining a keyword component of the probability based on a comparison between the keyword and content of the document.

7. The method of claim 6, wherein the determining comprises calculating the probability using:
    an affinity between the search query and the document; and
    the keyword component of the probability.

8. The method of claim 1, wherein:
    the assembling comprises determining an overall probability that the keyphrase describes the document; and
    the labeling comprises determining that the overall probability is greater than a predetermined overall threshold value.

9. The method of claim 1, further comprising training, by the processor, a supervised machine learning model using the training data.

10. A system configured to perform automatic keyphrase labeling comprising:
    at least one memory configured to store at least one search query; and
    a processor in communication with the at least one memory and configured to:
        extract a plurality of keywords from the at least one search query that resulted in a selection of a document included in a search result;
        for each of the plurality of keywords, determine a probability that the keyword describes the document;
        generate one or more keyphrases by performing processing including selecting each of the plurality of keywords having a probability greater than a predetermined threshold value for insertion into at least one of the one or more keyphrases and assembling the one or more keyphrases from the selected plurality of keywords;
        label the document with the keyphrase; and
        store the labeled document as training data in a document corpus in the at least one memory.

11. The system of claim 10, wherein the processor is configured to extract the plurality of keywords by performing processing comprising removing at least one uninformative portion from the at least one search query, wherein the plurality of keywords comprises a portion of the at least one search query that remains after the at least one uninformative portion is removed.

12. The system of claim 11, wherein the processor is configured to assemble the keyphrase by performing processing comprising:
    assigning a probability to each word in the at least one uninformative portion; and
    incorporating each word with probability assigned into the keyphrase for the document.

13. The system of claim 10, wherein the processor is configured to determine each probability by performing processing comprising determining an affinity between the search query and the document, the affinity forming a component of each probability of each respective keyword.

14. The system of claim 13, wherein determining the affinity comprises:
    determining an expected random distribution of selections of the document in the search result among selections of each of a plurality of documents appearing in the search result, wherein the document is one of the plurality of documents;
    determining an actual distribution of selections of the document; and
    setting the affinity based on a proportion of the actual distribution to the expected random distribution.

15. The system of claim 10, wherein the processor is configured to determine each probability by performing processing comprising, for each of the plurality of keywords, determining a keyword component of the probability based on a comparison between the keyword and content of the document.

16. The system of claim 15, wherein the processor is configured to determine each probability by performing processing comprising calculating the probability using:
    an affinity between the search query and the document; and
    the keyword component of the probability.

17. The system of claim 10, wherein:
the processor is configured to assemble the keyphrase by performing processing comprising an overall probability that the keyphrase describes the document; and
the processor is configured to label the document by performing processing comprising determining that the overall probability is greater than a predetermined overall threshold value.

18. The method of claim 17, wherein the processor is configured to train a supervised machine learning model using the labeled document as training data.

19. A method of automatic keyphrase labeling and machine learning training comprising:
extracting, by a processor, a plurality of keywords from at least one search query that resulted in a selection of a document of a plurality of documents included in a search result, the extracting comprising removing at least one uninformative portion from the at least one search query, wherein the plurality of keywords comprises a portion of the at least one search query that remains after the at least one uninformative portion is removed;
determining, by the processor, an affinity between the search query and the document, wherein determining the affinity comprises:
determining an expected random distribution of selections of the document among selections of any of the plurality of documents;
determining an actual distribution of selections of the document; and
calculating the affinity based on a proportion of the actual distribution to the expected random distribution;
for each of the plurality of keywords, determining, by the processor, a probability that the keyword describes the document, the determining comprising:
determining a keyword component of the probability based on a comparison between the keyword and content of the document; and
calculating the probability using:
the affinity between the search query and the document; and
the keyword component of the probability;
generating, by the processor, one or more keyphrases, the generating comprising:
selecting each of the plurality of keywords having a probability greater than a predetermined threshold value for insertion into at least one of the one or more keyphrases;
assigning a probability to each word in the at least one uninformative portion; and
assembling the one or more keyphrases from the selected plurality of keywords and each word in the at least one uninformative portion with probability assigned into the keyphrase for the document;
determining, by the processor, an overall probability that the keyphrase describes the document;
labeling, by the processor, the document with the keyphrase, the labeling comprising determining that the overall probability is greater than a predetermined overall threshold value; and
training, by the processor, a supervised machine learning model using the labeled document as training data.

20. The method of claim 19, further comprising determining, by the processor, a label for an unlabeled document by performing machine learning processing using the trained supervised machine learning model.

* * * * *